United States Patent [19]

Wen

[11] Patent Number: 5,682,302
[45] Date of Patent: Oct. 28, 1997

[54] ADAPTABLE POWER CONVERTER APPLYING DIGITIZED-WAVE-GENERATION FOR INTEGRATED CIRCUIT IMPLEMENTATION

[75] Inventor: Chau-Chun Wen, Chung Li, Taiwan

[73] Assignee: Delta Electronic, Inc., Taipei, Taiwan

[21] Appl. No.: 418,488

[22] Filed: Apr. 7, 1995

[51] Int. Cl.⁶ .................................................. H02M 1/12
[52] U.S. Cl. .......................... 363/43; 363/95; 363/134
[58] Field of Search ............................ 363/430, 95, 97, 363/131, 134

[56] References Cited

U.S. PATENT DOCUMENTS

| | | | |
|---|---|---|---|
| 4,166,247 | 8/1979 | Miyazawa | 363/43 |
| 4,476,520 | 10/1984 | Gallemore | 363/43 |
| 4,717,889 | 1/1988 | Engelmann | 363/43 |
| 4,920,472 | 4/1990 | Handler | 363/95 |
| 5,146,147 | 9/1992 | Wills et al. | 363/43 |
| 5,166,870 | 11/1992 | Shimizu et al. | 363/132 |
| 5,225,973 | 7/1993 | Patel et al. | 363/43 |

*Primary Examiner*—Jeffrey L. Sterrett
*Attorney, Agent, or Firm*—Bo-In Lin

[57] ABSTRACT

A power invertor system for converting a direct current (DC) input voltage to an alternate current (AC) output voltage with an output analog wave-shape. The power invertor system includes a digitized sequencing circuit for receiving a sequence of clock signals for generating a digitized up-down sequence as a function of the dock signals. The power invertor system further includes a digitized wave signal generating circuit employing the DC input voltage and the digitized up-down sequence to generate a digitized wave signal approximating the analog wave shape of the AC output voltage. The power invertor system further includes a filtering and smoothing circuit for filtering and smoothing the digitized wave signal to generate the AC output voltage with the analog wave shape.

4 Claims, 5 Drawing Sheets

ADAPTABLE POWER CONVERTER APPLYING DIGITIZED-WAVE-GENERATION FOR INTEGRATED CIRCUIT IMPLEMENTATION

BACKGROUND OF THE INVENTION

1. Field of the Invention

This invention relates generally to a system configuration and design method for power switching invertors. More particularly, this invention relates to an integrated circuit (IC) implementation of a power switching invertor applying digitized wave generation for applications to systems such as a ringing generator with improved circuit architecture capable of operating at higher frequency to reduce size and weight and to achieve high conversion efficiency and high level of dynamic responsiveness while maintaining high quality wave shape generation.

2. Description of the Prior Art

There is an increasing demand for more modularized AC power supply units with reduced size and weight in order to be more suitable and compatible with broad spectrum of modern applications such as tele-communication, mobile electronic office equipment, multi-media and network systems. Such as AC power supply units are often equipped with invertor devices capable of converting a DC input into AC out-put with a specific stable frequency and high quality wave shapes. Due to the larger size and greater weight of conventional invertors, they are often not suitable for implementation on a portable power supply unit. Furthermore, since the waveforms generated by the conventional invertors are generally not satisfactory to comply with the waveform quality requirements for modern electronic devices. Due to its inferior waveform quality, the usefulness of a conventional invertor is also limited for application in modern portable electronic systems where DC to AC power conversion is required.

Schimizu et al. disclose in U.S. Pat. No. 5,166,870 entitled 'Pulse Width-Modulation Control Device for Invertor Devices' (Issued on Nov. 24, 1992) a pulse width-modulation (PWM) control device which includes a superposed signal creating circuit for superposing a sine wave signal with a predetermined frequency upon a triangular wave signal as a carrier signal. The carrier signal has a higher frequency than the sine wave signal to form a superimposed signal. A pulse width modulating circuit compares the superposed signal with a predetermined threshold level to form a pulse width modulated signal. A pulse width limiting circuit limits the pulse width of the pulse width modulated signal when the pulse width signal has a pulse width lying outside of a predetermined range.

The PWM control device disclosed by Schimizu et al. is able to provide a PWM device for an invertor allowing the invertor to continue its switching operation without interruption even when the amplitude of the sine wave signal exceeds that of the triangular wave signal. However, the PWM control device includes a plurality of pulse transformers and each transformers has a primary coil, secondary coil and a plurality of field effect transistors (FETs) bridge-connected to each other to form the switching means. Therefore, the PWM control device as disclosed by Schimizu et al. is quite complicate and the performance characteristics of the device are closely coupled with the transformers. This patented PWM control device, in most cases is custom designed for specific system application and may not be easily changed for application to systems with different designs, e.g., different system frequency or voltage requirements. Furthermore, since the characteristics of the electronic circuits including the wave generation circuit are not suitable for integrated circuit (IC) implementation, the invertor disclosed by Schimizu et al. is not useful to reduce the size and weight of the invertor for the device to be suitable for portable operation.

Therefore, a need still exists in the art of design and manufacture of power switching converter to provide a design technique and circuit configuration for a power converter that is more flexibly adaptable to different systems with reduced size and weight by taking advantage of digital circuit design techniques and integrated circuit fabrication technology while capable of generating AC output with high quality wave forms.

SUMMARY OF THE PRESENT INVENTION

It is therefore an object of the present invention to provide a power invertor design technique and circuit architecture which would enable those of ordinary skill in the art to overcome the aforementioned difficulties and limitations encountered in the prior art.

Specifically, it is an object of the present invention to provide a power invertor design technique and circuit architecture which includes a digitized signal waveform generator to more precisely generate the target wave form with controllable wave form deviations.

Another object of the present invention is to provide a power invertor design technique and circuit architecture which includes a digitized signal waveform generator such that the power invertor can be more flexibly adaptable to different systems.

Another object of the present invention is to provide a power invertor design technique and circuit architecture which includes a digitized signal waveform generator wherein the wave form generator can be implemented by employing the IC fabrication technology to reduce the size and the cost of the power invertor.

Briefly, in a preferred embodiment, the present invention includes a power invertor system for converting a direct current (DC) input voltage to an alternate current (AC) output voltage with an output analog wave-shape. The power invertor system includes a digitized sequencing means for receiving a sequence of clock signals for generating a digitized up-down sequence as a function of the clock signals. The power invertor system further includes a digitized wave signal generating means employing the DC input voltage and the digitized up-down sequence to generate a digitized wave signal approximating the analog wave shape of the AC output voltage. The power invertor system further includes a filtering and smoothing means for filtering and smoothing the digitized wave signal to generate the AC output voltage with the analog wave shape.

It is an advantage of the present invention that it provides a power invertor design technique and circuit architecture which includes a digitized signal waveform generator to more precisely generate the target wave form with controllable wave form deviations.

Another advantage of the present invention is that it provides a power invertor design technique and circuit architecture which includes a digitized signal waveform generator such that the power invertor can be more flexibly adaptable to different systems.

Another advantage of the present invention is that it provides a power invertor design technique and circuit architecture which includes a digitized signal waveform generator wherein the wave form generator can be implemented by employing the IC fabrication technology to reduce the size and the cost of the power invertor.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
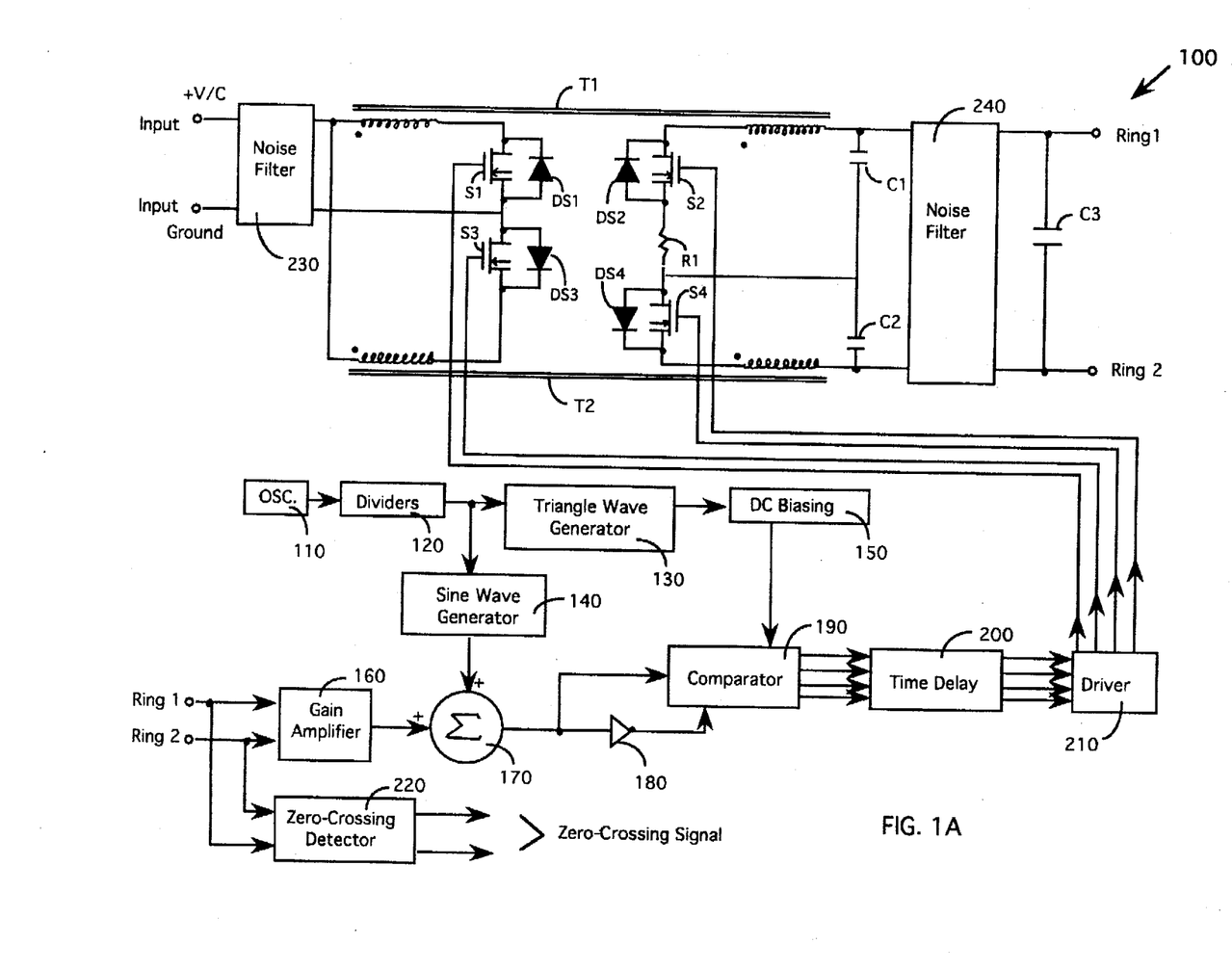
FIG. 1A is a functional block diagram showing the system configuration of a ringing generator of the present invention.
Figure 1B:
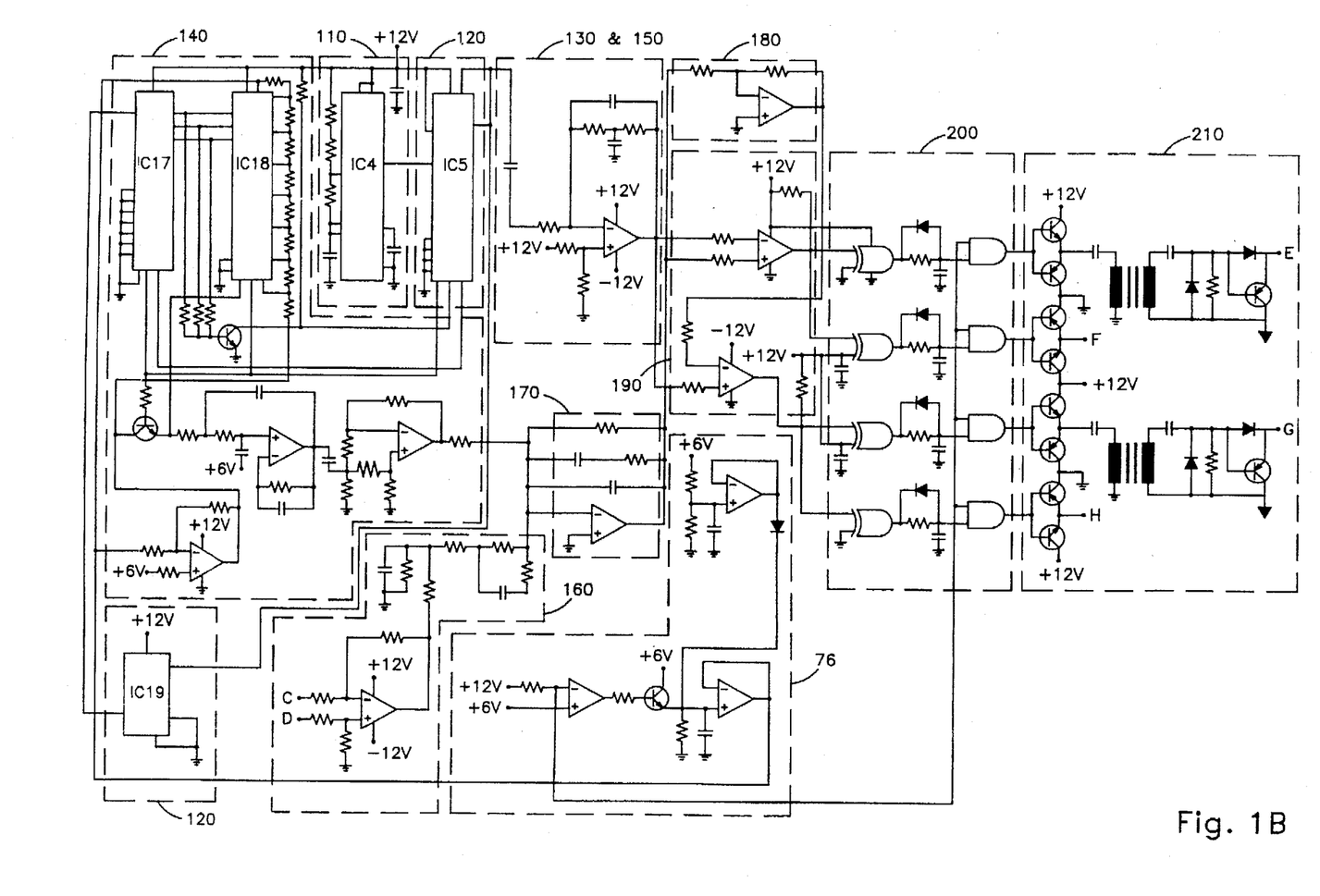
FIG. 1B is a circuit diagram showing the details of circuits of the ringing generator system of FIG. 1A.

In order to clearly and specifically disclose the present invention, a ringing generator system 100 is first described in FIGS. 1A and 1B. The description of this ringing generator 100 illustrates a specific example of the use of a digitized-wave-generation circuit employed in a power invertor device taught by the present invention for the construction of ringing generator 100 which is a flexibly adaptable, compact, reliable and producing a ringing signal with high wave quality. FIG. 1A is a functional block diagram of a ringing generator 100 and FIG. 1B shows in more details the circuits for each function block corresponding to FIG. 1A. Since the main thrust of the present invention is to employ a digitized waveform generator in the power invertor devices for more flexibly adaptable, higher wave quality, reduced weight and size and more reliable systems. And, since the circuit details and their functions are well known in the art. The details of these circuits as shown in FIG. 1B are for reference purpose only. The details of each circuit element and their connections would not be described These details shown in FIG. 1B can be fully understood by those with ordinary skill in the art by referencing to FIG. 1A. The details of circuits as shown in FIG. 1B would also useful to enable the ordinary skilled artisans to carry out the invention.

Please refer to FIGS. 1A and 1B, a square wave is generated from an oscillator 110 representing a dock signal. The square wave clock signal is inputted to a divider 120 wherein a frequency division process is being carried out, In addition to the frequency division process, the divider 120 can also generate a second square wave which has a 50% duty of the input square wave. The output of generated by the frequency divider 120 is transmitted to a triangle wave generator 130. The input signal from the divider 120 is processed by the triangle wave generator 130 to generate a carrier wave for the pulse width modulation. The carrier wave signal generated by the triangle wave generator 130 is inputted to a DC biasing circuit 150 to adjust for a DC bias for the triangle carrier wave. The triangle carrier wave with properly adjusted DC bias is received by a first input terminal of a comparator 190 after the carrier wave signals are processed by the DC biasing circuit 150.

Figure 2:
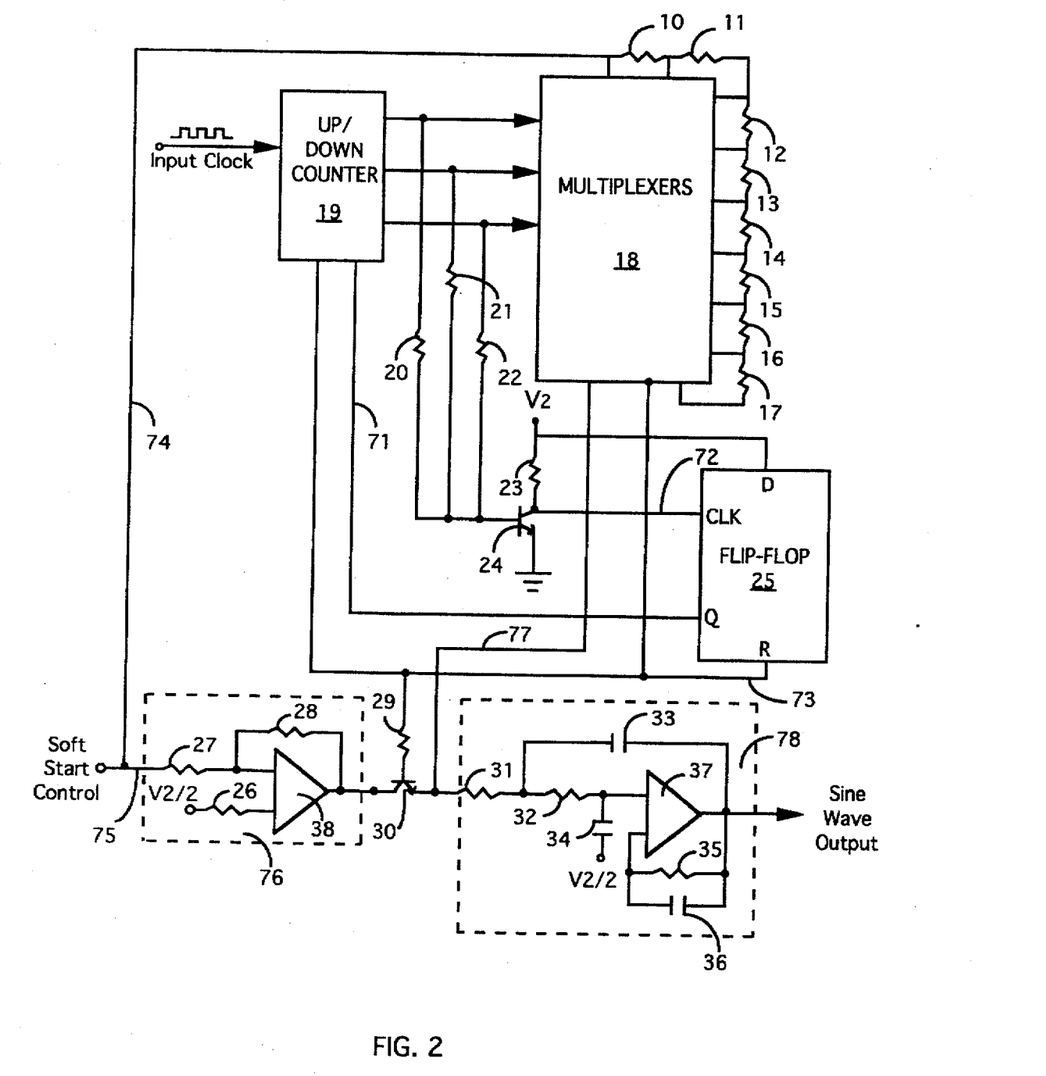
FIG. 2 is a circuit diagram for a digital sine wave generator for the ringing generator of FIG. 1 according to the present invention.

The output from the divider 120 is also received by a sine wave generator 140. The sine wave generator 140 has an up-counter and a down counter and a low pass filter which process the input received from the divider 120 to generate a sine wave to be further processed by a summing circuit 170. More details of the digitized waveform signal generator 140 are shown in FIG. 2. The sine wave generated from the sine wave generator 140 is summed with an output from a gain amplifier 160 wherein the output signals of ring 1 and ring 2 are proportionally reduced by the gain amplifier 160 to be used in the summing circuit 170 as a feedback signal input An error signal is generated by the summing circuit 170 as the sum of the signals received from the sine wave generator 140 and the feedback signals processed by gain amplifier 160. The error signals generated by the summing circuit 170 is then received by an invertor 180 and a comparator 190.

The comparator 190 compares the DC biased triangle carrier wave and the output from the invertor 180. Four output signals are generated from the comparator 190 which then transmitted via a time delay circuit 200 for inputting to a driver 210. The time delay circuit 200 adds appropriate delays to these four signals for inputting to the driver 210. The delay circuit 200 controls the delay of these signals in order to prevent short circuit of switch devices S1, S2, S3, and S4 which are switched on and off by these four control signals generated by the driver 210. The function of these four switches S1, S2, S3, and S4 are to convert the DC input voltage $+V_{1C}$ from the first stage through the high frequency transformers T1 and T2 to the load voltage in the second stage. The operational frequency is set to approximately 100 KHz. By setting the operational frequency in this higher range, the size of the transformers T1 and T2 can be reduced which allows the ringing generator 100 to be manufactured with a reduced volume and weight. The high frequency wave signals generated at the secondary side of the transformers T1 and T2 are filtered by three capacitors, i.e., C1, C2, and C3 and further processed by a noise filter for filtering the signals near 100 KHz before the ringing signals, i.e., RING1 and RING2, of approximately 25 Hz are outputted.

The input DC voltages, i.e., $+V_{1C}$ and the input ground voltage are first filtered by a noise filter 230 to eliminate the noises generated in the primary side at a frequency of about 200 KHz to prevent further propagation of these high frequency noises into the system. The function of the noise filter 240 is to filter out the common mode noises or differential mode noise generated in the secondary side to produce the final ringing signals RING1 and RING2 at about 25 Hz and output voltage at approximately 75 volts. The ringing generator also provides a zero crossing detector 220 which detects the zero crossings of the output signals RING1 and RING2. The detected zero crossing signals can be used for the design system relay to reduce the sudden turning on and off at a high voltage. The useful life cycle of the relay system is extended because the damages caused by sparks generated at high voltage sudden turning on and off are minimized by using the zero crossing signals provide by the ringing generator 100.

The present invention thus discloses a ringing signal generator 100 which includes means for generating a relatively low power driving signal representing a ringing signal and a pulse width modulation means, e.g., the triangle wave generator 130, for coupled to the low power driving signal generating means for generating a bipolar pulses with widths representing an amplitude of the low power driving signal wherein the adjoining pulses having opposite polarities. The ringing generator 100 further includes a means, e.g., transformers T1 and T2, coupled to the bipolar pulse generating means for producing a high power ringing signal in response to the series of bipolar pulses. Wherein, the low power driving signal generating means further includes an oscillator 110, a DC biasing means 150 for generating a DC bias signal and a digitized sine wave generator 140 coupled to the oscillator 110 for generating an analog sine signal. The low power driving signal generating means further includes a coupling driver means, e.g., the comparator 190, the time delay circuit 200, and the driver 210, for coupling the sine wave generating means 140, the DC biasing means 150, and the pulse width modulation means 130 for generating the low power driving signal. In a preferred embodiment as that shown in FIGS. 1A and 1B, the high power ringing signal generating means is a four-phase fly-back signal generating means which is controlled by four switches S1, S2, S3, and S4 to turn on and off by the power driving signal received from the driver 210. The four-phase flyback signal generating means is operated at a higher frequency around 100 KHz which includes a filtering means for generating a ringing signal output at approximately 25 Hz. In a preferred embodiment, the digitized sine wave generator 140 includes a digitized sequencing means for receiving a sequence of clock signals for generating a digitized up-down sequence as a function of the clock signals and a digitized wave signal generating means employing the DC input voltage and the digitized up-down sequence to generate a digitized wave signal approximating the analog sine wave. The digitized sine wave generator also includes a filtering and smoothing means for filtering and smoothing the digitized wave signal to generate the analog sine wave. The details of the digitized sine wave generating means, including the digitized up-down sequencing means and the digitized wave generating means, will be further provided below.

FIG. 2 shows the circuit structure of the sine wave generator 140. The input clock signals are inputted to an up/down counter 19. Three bits of output signals a s function of time are generated by the up-down counter 19 from output signal lines 20, 21, and 22 as listed below:

TABLE 1

| UP Time | State of Line 20(S$_{20}$) | State of Line 21(S$_{21}$) | State of Line 22(S$_{22}$) | Down Time |
| --- | --- | --- | --- | --- |
| 1 | 0 | 0 | 0 | 16 |
| 2 | 0 | 0 | 1 | 15 |
| 3 | 0 | 1 | 0 | 14 |
| 4 | 0 | 1 | 1 | 13 |
| 5 | 1 | 0 | 0 | 12 |
| 6 | 1 | 0 | 1 | 11 |
| 7 | 1 | 1 | 0 | 10 |
| 8 | 1 | 1 | 1 | 9 |

The states of the lines 20, 21 and 22, i.e., (S$_{20}$), (S$_{21}$), and (S$_{22}$), are inputted to the gate of a transistor 24 which in turn generate input signals for a flip flop circuit 25. The flip flop circuit 25 controls the up and down sequences of the updown counter 19. For example, when the states of the output lines 20, 21, and 22 are {0, 0, 0}, an up-counting sequence begins. When the output signals of these three lines reaches {1, 1, 1}, a down sequence starts. The updown counter 19 and the flip flop circuit 25 thus constitute a digital up-down sequencing means to generate digital sequencing signals as that shown in Table 1 above.

Figure 3A:
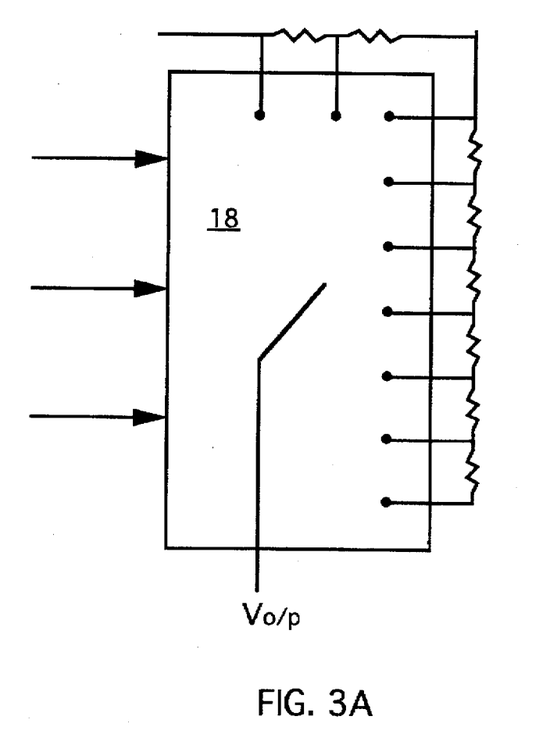
FIGS. 3A is a block diagram showing the function performed by a multiplexer as a variable switch for connecting to different segments of resistor combinations.
Figure 3B:
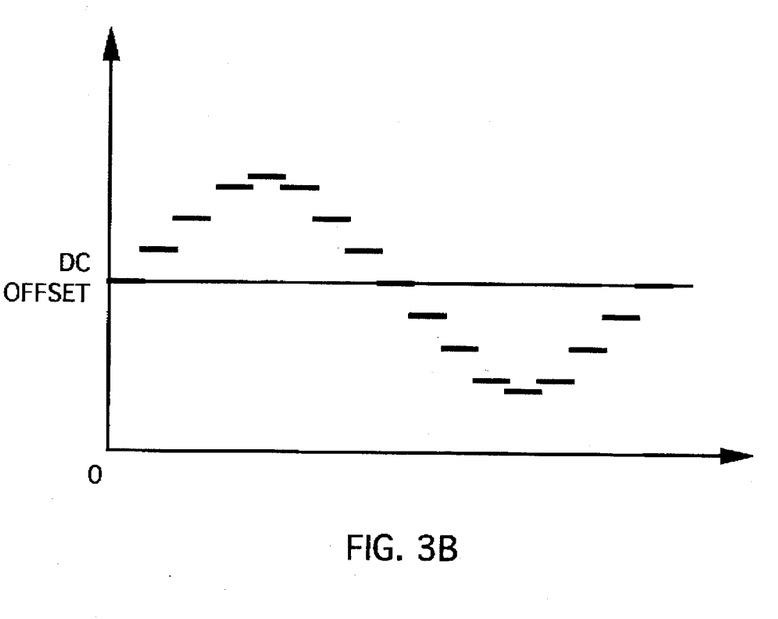
FIG. 3B is wave shape diagram showing the digitized wave shape as function of time approximating a targeted analog waveform.

The output signals on lines 20, 21, and 22 are received by a multiplexer 18 which employs eight resistors, i.e., resistors 10 to 17 to generate an output signal on line 77. FIG. 3A shows the function performs by the multiplexer 18 as a variable voltage switching circuit which controls the switch to connect to different segments of resistors in response to the {S$_{20}$, S$_{21}$, S$_{22}$} received from the updown counter 19. The voltage generated by the multiplexer 18 is shown in FIG. 3B which has a digitized wave shape. The multiplexer 18 is a digitized wave signal generating means which takes the digital sequencing signals generated by the digital updown sequencing means to generate a digitized wave signal wherein the wave signal has approximate wave shape of the target analog wave signal to be generated eventually.

Controlled by the clock signals, a signal with a frequency of about 25 Hz is generated in the up/down counter 19 and outputted from a signal output line 71. Meanwhile, the output signals from the up/down counter 19, the time sequential up-counting numbers or the down-counting numbers, are transmitted from three resistor lines 20, 21, and 22 to a transistor device 24 where an AND operation is performed to generate an output signal of about 50 Hz on an output line 72 from the transistor device 24. This signal of about 50 Hz is then received by a FLIP-FLOP 25 to generate a clock signal of about 25 Hz in an output line 73. A soft start control signal is received by a gain amplifier 76 via an input line 75, the same soft start control signal is also transmitted via a signal line 75 to a multiplexer 18. The amplitude of the sine wave generated by the sine ware generator 140 is controlled by the voltage of the soft start control signal. The peak value of the sine wave reference is controlled by the output of the gain amplifier 76. The output signals from the multiplexer 18 is outputted from signal line 77 to a low pass filter 78 comprising resistors 31 and 32 and capacitor 33, 34, 36 and the amplifier 37. The digitized sine wave received from the multiplexer with the peak value of the sine reference controlled by the gain amplifier 38 is received and filtered by the low pass filter 78 to generate a high quality sine wave with very small total harmonic deviation (THD). A typical total harmonic deviation (THE)) generated by the use of the circuit has an approximate deviation of about 0.2%. The low pass filter 78 thus constitutes a filtering and smooth means to filter and smooth the digitized wave signal approximating the analog wave signal to generate the target analog wave signal.

As shown in FIG. 1B, the up/down counter 19 is preferably a National CD4516, the multiplexer 19 is a National CD4051 IC, the low pass filter employs an IC filter which is a National 2IC16 IC, and the data sheet of these IC chips are attached as Appendix A. These IC devices are commonly available on the market as multi-source components. The functions and specifications are well known among those of ordinary skill in the art. The novelty of this invention is to combine the individual functions of these IC devices to generate digitized waveforms and then applying the digitized waveforms in a power inverter to generate AC output from a DC input.

In a preferred embodiment, the present invention thus discloses a power invertor system for converting a direct current (DC) input voltage to an alternate current (AC) output voltage with an output analog wave-shape. The power invertor system includes a digitized sequencing means which including an up/down counter 19 and a flipflop circuit 25, for receiving a sequence of clock signals for generating a digitized up-down sequence as a function of the clock signals. The power invertor system further includes a digitized wave signal generating means, i.e., the multiplexer 18, which employs the DC input voltage and the digitized up-down sequence to generate a digitized wave signal approximating the analog wave shape of the AC output voltage. The power invertor system further includes a filtering and smoothing means, i.e., the low pass filter 78, for filtering and smoothing the digitized wave signal to generate the AC output voltage with the analog wave shape.

In another preferred embodiment, the present invention discloses a power invertor system for converting a direct current (DC) input voltage to an alternate current (AC) output voltage with an output analog wave-shape. The power invertor system includes a digitized sequencing means for receiving a sequence of clock signals for generating a digitized up-down sequence as a function of the clock signals. The digitized sequencing means including an updown counter 19 for generating a continuously increasing digital numbers in an up-counting mode or a continuously decreasing digital numbers in a down-counting mode and a flip-flop circuit 25 for repetitively changing the updown counter from the up-counting mode to the down-counting mode and then from the down-counting mode to the upcounting mode. The power invertor system further includes a digitized wave signal generating means employing the DC input voltage and the digitized up-down sequence to generate a digitized wave signal approximating the analog wave shape of the AC output voltage wherein the digitized wave signal generating means including a multiplexer 18 and a sequence of serially connected resistors, e.g., resistors 10 to 17, wherein the multiplexer 18 responding to the continuously increasing or continuously decreasing numbers for employing a different combination of the serially connected resistors, e.g., resistors 10 to 17, for generating the digitized wave signal approximating the analog wave shape of the AC output voltage. The power invertor system further includes a filtering and smoothing means for filtering and smoothing the digitized wave signal to generate the AC output voltage with the analog wave shape wherein the filtering and smoothing means including a low pass filter 78 which further including a plurality of interconnected resistor, e.g., resistors 31 and 32, capacitors, e.g., capacitors 33, 34, and 36, and an amplifier 37. The power invertor system further includes an amplitude control means 76 coordinating with the digitized wave signal generating means and the filtering and smoothing means 78 for controlling and adjusting an amplitude of the AC output voltage with the analog wave shape.

This invention also discloses a method for converting a direct current (DC) input voltage to an alternate current (AC) output voltage with an output analog wave-shape. The method includes the steps of: (a) employing a digitized sequencing means, which including an up/down counter 19 and a flip-flop circuit 25, for receiving a sequence of dock signals for generating a digitized up-down sequence as a function of the sequence of clock signals; (b) employing a digitized wave signal generating means, i.e., the multiplexer 18 and a series of interconnected resistors 10 to 17, for applying the DC input voltage and the digitized up-down sequence to generate a digitized wave signal approximating the analog wave shape of the AC output voltage; and (c) employing a filtering and smoothing means, i.e., the low pass filter 78, for filtering and smoothing the digitized wave signal to generate the AC output voltage with the analog wave shape.

Figure 4:
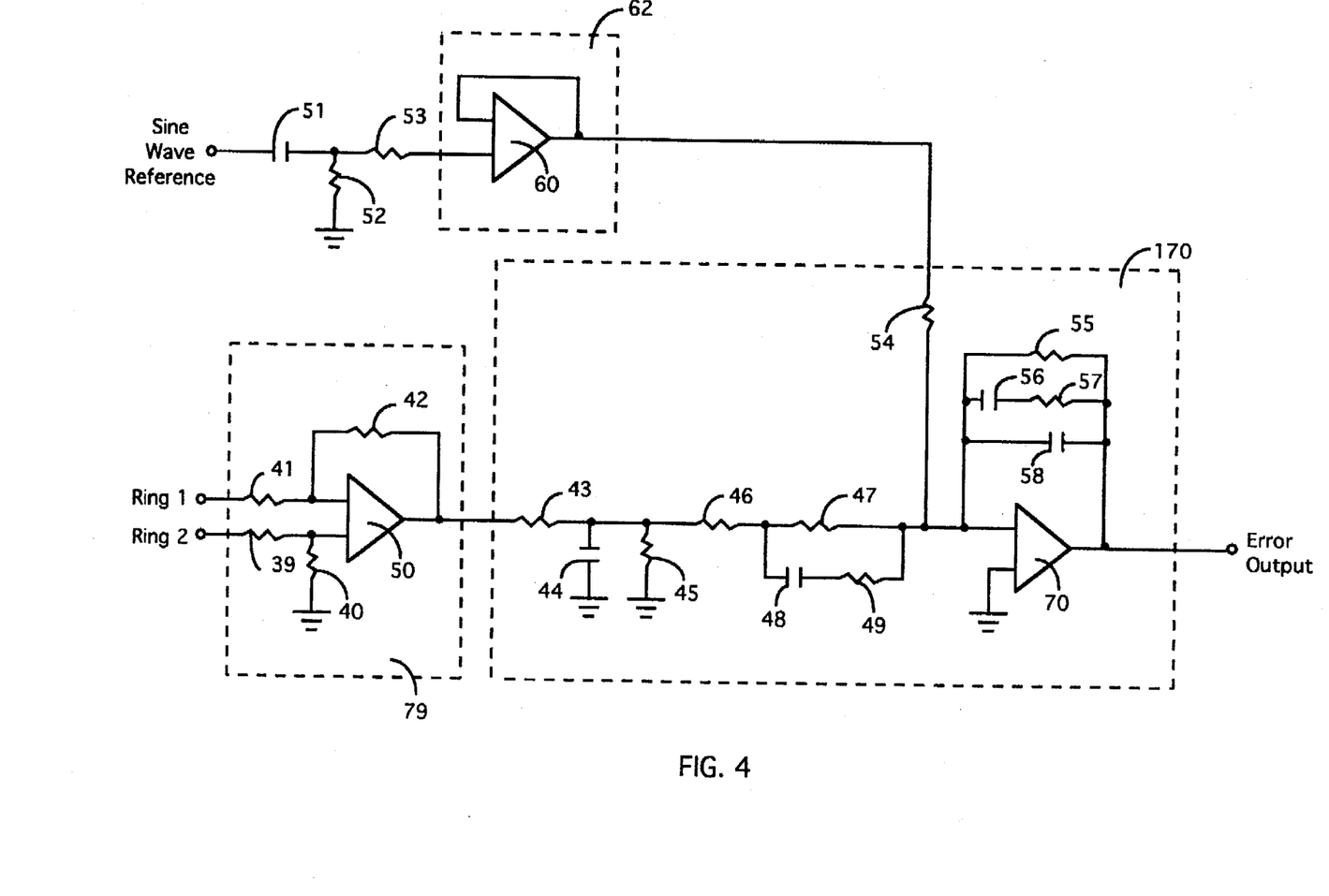
FIG. 4 is a functional block diagram showing the feedback portion of the ringing generator of FIGS. 1A and 1B.

FIG. 4 shows the feedback circuit of the ringing generator 100. The feedback signals from the ringing generator 100, i.e., the output signals RING1 and RING2, are received by a differential amplifier 79 which includes an operational amplifier 50 and resistors 39, 40, 41, and 42. The output signals, i.e., RING1 and RING2, have an amplitude of about 75 volts at a frequency of approximately 25 Hz. The feedback signals are first processed by the differential amplifier 79 to reduce the voltage amplitudes such that damages to circuit components in the feedback loop caused by high feedback voltages may be eliminated. Meanwhile, a sine wave reference signal is received by a capacitor 51 to offset the DC bias of the sine wave reference signal. The reference signal is then received by a voltage follower 62 which includes resistors 52 and 53, and an operational amplifier 60. The output signals generated by the voltage follower 62 and the differential amplifier 79 are received by an error amplifier 80. The error amplifier then applies the sine wave reference signals from the voltage follower 62 and the processed feedback signals from the differential amplifier 79 to carry out a subtraction operation to obtain an error output which is then used as a feedback signal for the ringing generator 100.

Therefore, the present invention provides a power invertor design technique and circuit architecture which enables those of ordinary skill in the art to overcome the difficulties and limitations encountered in the prior art. Specifically, it includes a digitized signal waveform generator to enable the generation of waveform with precisely controllable waveform deviations from the target analog waveform. Higher quality of analog wave signals can thus be generated. By employing the digitized signal waveform generator, the power invertor system can be more flexibly adaptable to different types of systems. It also provides a power invertor design technique and circuit architecture wherein the wave form generator can be implemented by employing the IC fabrication technology to reduce the size and the cost of the power invertor.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A power inverter system for converting a direct current (DC) input voltage to an alternate current (AC) output voltage with an output analog wave-shape comprising:

digitized sequencing means for receiving a sequence of clock signals for generating a digitized up-down sequence as a function of said clock signals wherein said digitized sequencing means includes an up-down counter for generating a continuously increasing digital numbers in an up-counting mode or a continuously decreasing digital numbers in a down-counting mode and a flip-flop circuit for repetitively changing said up-down counter from said up-counting mode to said down-counting mode and then from said down-counting mode to said up-counting mode;

a digitized wave signal generating means employing said DC input voltage and said digitized up-down sequence to generate a digitized wave signal approximating said analog wave shape of said AC output voltage;

an amplitude control means coordinating with said digitized wave signal generating means and said filtering and smoothing means for controlling and adjusting an amplitude of said AC output voltage with said analog wave shape; and a filtering and smoothing means for filtering and smoothing said digitized wave signal to generate said AC output voltage with said analog wave shape.

2. The power inverter system of claim 1 wherein:

said digitized wave signal generating means includes a multiplexer and a sequence of serially connected resistors wherein said multiplexer responding to said continuously increasing or continuously decreasing numbers for employing a different combination of said serially connected resistors for generating said digitized wave signal approximating said analog wave shape of said AC output voltage.

3. The power inverter system of claim 2 wherein:

said filtering and smoothing means includes a low pass filter which further including a plurality of interconnected resistors, capacitors, and an amplifier.

4. A power inverter system for converting a direct current (DC) input voltage to an alternate current (AC) output voltage with an output analog wave-shape comprising:

digitized sequencing means for receiving a sequence of clock signals for generating a digitized up-down sequence as a function of said clock signals wherein said digitized sequencing means including an up-down counter for generating a continuously increasing digital numbers in an up-counting mode or a continuously decreasing digital numbers in a down-counting mode and a flip-flop circuit for repetitively changing said up-down counter from said up-counting mode to said down-counting mode and then from said down-counting mode to said up-counting mode;

a digitized wave signal generating means employing said DC input voltage and said digitized up-down sequence to generate a digitized wave signal approximating said analog wave shape of said AC out-put voltage wherein said digitized wave signal generating means includes a multiplexer and a sequence of serially connected resistors wherein said multiplexer responding to said continuously increasing or continuously decreasing numbers for employing a different combination of said serially connected resistors for generating said digitized wave signal approximating said analog wave shape of said AC output voltage;

a filtering and smoothing means for filtering and smoothing said digitized wave signal to generate said AC output voltage with said analog wave shape wherein said filtering and smoothing means includes a low pass filter which further includes a plurality of interconnected resistors, capacitors, and an amplifier; and an amplitude control means coordinating with said digitized wave signal generating means and said filtering and smoothing means for controlling and adjusting an amplitude of said AC output voltage with said analog wave shape.

\* \* \* \* \*